(12) United States Patent
Lee

(10) Patent No.: US 8,113,231 B2
(45) Date of Patent: Feb. 14, 2012

(54) DEVICE FOR CONTROLLING WATER LEVEL

(75) Inventor: In Tak Lee, Gongju-si (KR)

(73) Assignee: Woongjin Coway Co., Ltd., Gongju-si, Chungcheongnam-do (KR)

( * ) Notice: Subject to any disclaimer, the term of this patent is extended or adjusted under 35 U.S.C. 154(b) by 712 days.

(21) Appl. No.: 12/256,120

(22) Filed: Oct. 22, 2008

(65) Prior Publication Data

US 2009/0126804 A1    May 21, 2009

(30) Foreign Application Priority Data

Oct. 23, 2007  (KR) .................. 10-2007-0106784
Oct. 17, 2008  (KR) .................. 10-2008-0101948

(51) Int. Cl.
*F16K 31/18* (2006.01)

(52) U.S. Cl. .................. 137/433; 137/423; 137/613

(58) Field of Classification Search .................. 137/391, 137/411, 423, 613, 429, 430, 433, 558; 222/67, 222/68; 210/121, 123

See application file for complete search history.

(56) References Cited

U.S. PATENT DOCUMENTS

| 2,366,808 | A | * | 1/1945 | Schultz | 137/429 |
| 2,752,936 | A | * | 7/1956 | Cantalupo | 137/414 |
| 3,646,948 | A | * | 3/1972 | Athey | 137/563 |
| 4,235,827 | A | * | 11/1980 | Gopel | 137/423 |
| 5,058,624 | A | * | 10/1991 | Kolze | 137/614.14 |
| 6,062,255 | A | * | 5/2000 | Busick | 137/423 |
| 6,089,258 | A | * | 7/2000 | Busick et al. | 137/423 |
| 6,532,984 | B2 | * | 3/2003 | Liu | 137/391 |
| 7,581,553 | B2 | * | 9/2009 | Kim et al. | 134/184 |
| 7,614,420 | B2 | * | 11/2009 | Rustad et al. | 137/423 |
| 2007/0204923 | A1 | * | 9/2007 | Da Pont | 137/613 |
| 2008/0128025 | A1 | * | 6/2008 | Brown et al. | 137/9 |

FOREIGN PATENT DOCUMENTS

| FR | 2412110 | A | * | 8/1979 |
| GB | 2149148 | A | * | 6/1985 |
| GB | 2256257 | A | * | 12/1992 |

* cited by examiner

*Primary Examiner* — Kevin Lee
*Assistant Examiner* — Craig J Price
(74) *Attorney, Agent, or Firm* — Ohlandt, Greeley, Ruggiero & Perle, LLP

(57) ABSTRACT

Disclosed herein is a water level controlling device for intercepting the supply of water to the water reservoir of a water purification system. The water level controlling device includes a water reservoir having a plurality of diaphragms which are provided on the lower surface of the water reservoir in such a way as to move up and down. A flow body is mounted to the lower surface of the water reservoir and defines a water circulation path, with a plurality of control parts provided in the circulation path to block the flow of water by the corresponding diaphragms. A plurality of floaters moves up and down in the water reservoir according to the water level. An actuator moves each of the diaphragms to the corresponding control part as each of the floaters rises, thus intercepting the flow of water passing through the control part.

22 Claims, 10 Drawing Sheets

DEVICE FOR CONTROLLING WATER LEVEL

BACKGROUND OF THE INVENTION

1. Field of the Invention

The present invention relates generally to a water level controlling device and, more particularly, to a water level controlling device which mechanically intercepts the supply of water to a water reservoir, thus controlling the water level of the water reservoir.

2. Description of the Related Art

Generally, a water level controlling device is installed in a water reservoir of a water purification system, the water reservoir being connected to a main tank storing purified water before dispensing it by a cock. The water level of the water reservoir is the same as that of the main tank. When the purified water stored in the water reservoir exceeds a predetermined water level, the water level controlling device functions to stop a water purifying operation and block the flow of the purified water into the water reservoir.

The water level controlling device of the water purification system is installed at a proper position according to the height of the water reservoir. The water level controlling device includes a control valve and a valve body. The control valve intercepts the flow of purified water passing through a body, using a floater which rises as a water level rises in the body which guides purified water into the water reservoir. As the floater rises, the valve body is rotated, thus closing an outlet of a duct which communicates with the body.

Here, one end of the valve body is rotatably coupled to a predetermined portion of the water reservoir, while the other end is secured to a predetermined portion of the upper surface of a rotary body which is compressible when the floater rises and is inserted into the outlet for dispensing purified water by the rotation of the rotary body, thus blocking the supply of the purified water through the outlet.

The rotation of the valve body results from the rotating motion of the rotary body which is connected to the upper surface of the floater as the floater rises. The valve body is rotated by the rotary body and inserted into the outlet, thus closing the outlet.

Further, since the rotary body is supported by the floater, the motion of the floater is connected to that of the rotary body. The rotating motion of the rotary body depends on the upward movement of the floater.

Thus, when the floater comes into close contact with the water reservoir or mechanical friction is increased in the operation of the control valve connected to the floater, it is difficult for the floater to rise in the water reservoir, so that the flow of purified water is not blocked by the control valve in the body, and the rotation of the rotary body depending on the upward movement of the floater is stopped. Thus, the outlet which is used to supply purified water to the water reservoir is kept open, so that the purified water overflows the water reservoir, thus causing the malfunction of the water purification system.

Further, the rising of the floater may be influenced by the rotary body. Thus, when the rotation of the rotary body is defective or the purified water is put into the rotary body, so that the weight of the rotary body is increased, the rising of the floater is delayed or the distance the floater is displaced is reduced and thereby the operation of the control valve and the operation of closing the outlet using the valve body may be stopped. Further, the purified water may be slowly fed into the water reservoir to overflow the water reservoir.

Further, the motion of the rotary body depends on the motion of the floater which rises in the water reservoir, thus resulting in an imperfect dual intercepting operation. When defects occur primarily in the control valve of the floater and the outlet is closed secondarily by the valve body, the supply of purified water to the water reservoir is blocked, thus preventing the purified water from overflowing the water reservoir. However, water purifying operation is continuously conducted, so that an excessive amount of domestic water is produced by a filter unit.

Meanwhile, the upper portion of the water reservoir of a conventional water purification system is open to the atmosphere, so that worms such as ants or cockroaches may enter the water reservoir, and the water reservoir may be contaminated by general air-borne germs.

Further, the rotary body is supported by the upper surface of the floater, so that the water level of the water reservoir is limited by the rotary body and thereby the upper space of the water reservoir for storing purified water cannot be fully utilized.

Further, because of the operating noise and chattering noise of a pressure reducing valve which is installed above the control valve of the floater in the body, the noise generated by the pressure reducing valve may become the main cause of the abnormal noise of a product in consideration of the position characteristics of the water level controlling device which is located at the uppermost end of the water reservoir.

SUMMARY OF THE INVENTION

Accordingly, the present invention has been made keeping in mind the above problems occurring in the prior art, and an object of the present invention is to provide a water level controlling device, which reliably intercepts the supply of water to a water reservoir to control a water level, prevents the interior of a water purification system from becoming contaminated, economically utilizes the inner space of the water reservoir, and reduces the noise of the water purification system.

In order to accomplish the above object, the present invention provides a device for controlling a water level, including a water reservoir which has inner space such that water is introduced and stored therein, with a plurality of diaphragms provided on a lower surface of the water reservoir in such a way as to move up and down, a flow body which is mounted to the lower surface of the water reservoir and defines a circulation path such that water is fed into a first end of the flow body and is discharged to a second end of the flow body, with a plurality of control parts provided in the circulation path to block a flow of water by the corresponding diaphragms, a plurality of floaters which move up and down in the inner space of the water reservoir according to a water level, and an actuating means for moving each of the diaphragms to the corresponding control part as each of the floaters rises, thus intercepting the flow of water passing through the control part.

A partition wall is provided in a center of the water reservoir to part the inner space, and a flow path is formed in the partition wall, and the floaters are provided on opposite sides of the partition wall.

A guide member protrudes from the bottom of the water reservoir and is slidably coupled to each of the floaters to guide vertical movement of the floater.

A slide part is provided on the lower surface of each of the floaters in such a way as to protrude into the inner space of the floater, so that the guide member is slidably inserted into the slide part.

A rib is vertically provided on the inner wall of the water reservoir to support the vertical movement of each of the floaters.

A lid is provided on top of the water reservoir to close the inner space thereof, and includes an air vent filter which allows air to circulate from the inner space of the water reservoir to an outside and prevents impurities contained in external air from entering the water reservoir.

The air vent filter includes an antibacterial function.

A packing is provided on the upper end of the water reservoir and is in close contact with a lower surface of the lid, thus preventing impurities from entering the water reservoir.

A vertical plate is provided on a circumference of the lower surface of the lid to surround an outer surface of the packing, and a protrusion is provided at a predetermined position on an upper portion of the water reservoir to support an inner surface of the vertical plate and a lower surface of the packing.

A fitting groove is formed in the packing so that the upper end of the water reservoir is fitted into the fitting groove.

A plurality of circle parts is provided in a row on the lower surface of the water reservoir in such a way as to protrude downwards, with the corresponding diaphragms provided in the circle parts, and the plurality of circle parts is inserted into the corresponding control parts of the flow body.

Each of the control parts comprises a support plate having a circular inner wall so that the corresponding circle part is inserted into and secured to the support plate, and an annular groove is provided in a lower portion of the support plate so that a lower end of the corresponding circle part is inserted into the annular groove.

Each of the control parts includes a control pipe for defining therein a path along which water flows downwards, the control pipe being opened or closed by vertical movement of the corresponding diaphragm, an annular guide wall surrounding an upper portion of the control pipe and guiding the flow of water in a direction from a lower portion of the control pipe to the upper portion thereof, and a coupling path provided on a lower portion of a side of the annular guide wall and connected to the circulation path, thus permitting water to flow through an annular path to the control pipe.

A contact end is provided on the upper end of the control pipe and becomes gradually sharper in a direction from a lower position to an upper position to be in close contact with the corresponding diaphragm.

The actuating means includes a plunger slidably coupled to the lower surface of the water reservoir in such a way as to move up and down and secured to a predetermined position by magnetic force, the lower end of the plunger being detachably attached to the corresponding diaphragm, a spring provided above the plunger and compressing the plunger to provide pressurizing force for closing each of the control parts to the corresponding diaphragm, and a circular magnet provided on an upper portion of the plunger to surround the plunger and secured to an interior of the corresponding floater, the circular magnet applying magnetic force to the plunger when the plunger is moved upwards, thus stopping downward movement of the plunger which is biased by the spring.

Each of the control parts has the spring of a different elastic modulus, thus specifying an order for closing the control parts.

A magnetic body is provided on the upper portion of each of the floaters, and a magnetic sensor is provided on the upper portion of the water reservoir and changes magnetic force when each of the floaters moves upwards and the magnetic body approaches the magnetic sensor, thus detecting a full water level of the water reservoir.

The magnetic sensor is selected from a group consisting of a reed switch, a MR sensor, and a hall sensor.

The device further includes a water level sensor which is provided at a predetermined position of the water reservoir to detect the full water level of the water reservoir.

The device further includes a constant flow regulating valve provided in the circulation path to regulate a flow rate of introduced water.

The constant flow regulating valve is provided in the control part under an associated diaphragm.

The constant flow regulating valve controls the flow rate such that it is 1 L/min or less.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The above and other objects, features and advantages of the present invention will be more clearly understood from the following detailed description taken in conjunction with the accompanying drawings. Hereinafter, the water level controlling device according to the preferred embodiment of the present invention will be described in detail with reference to the accompanying drawings.

Figure 1:
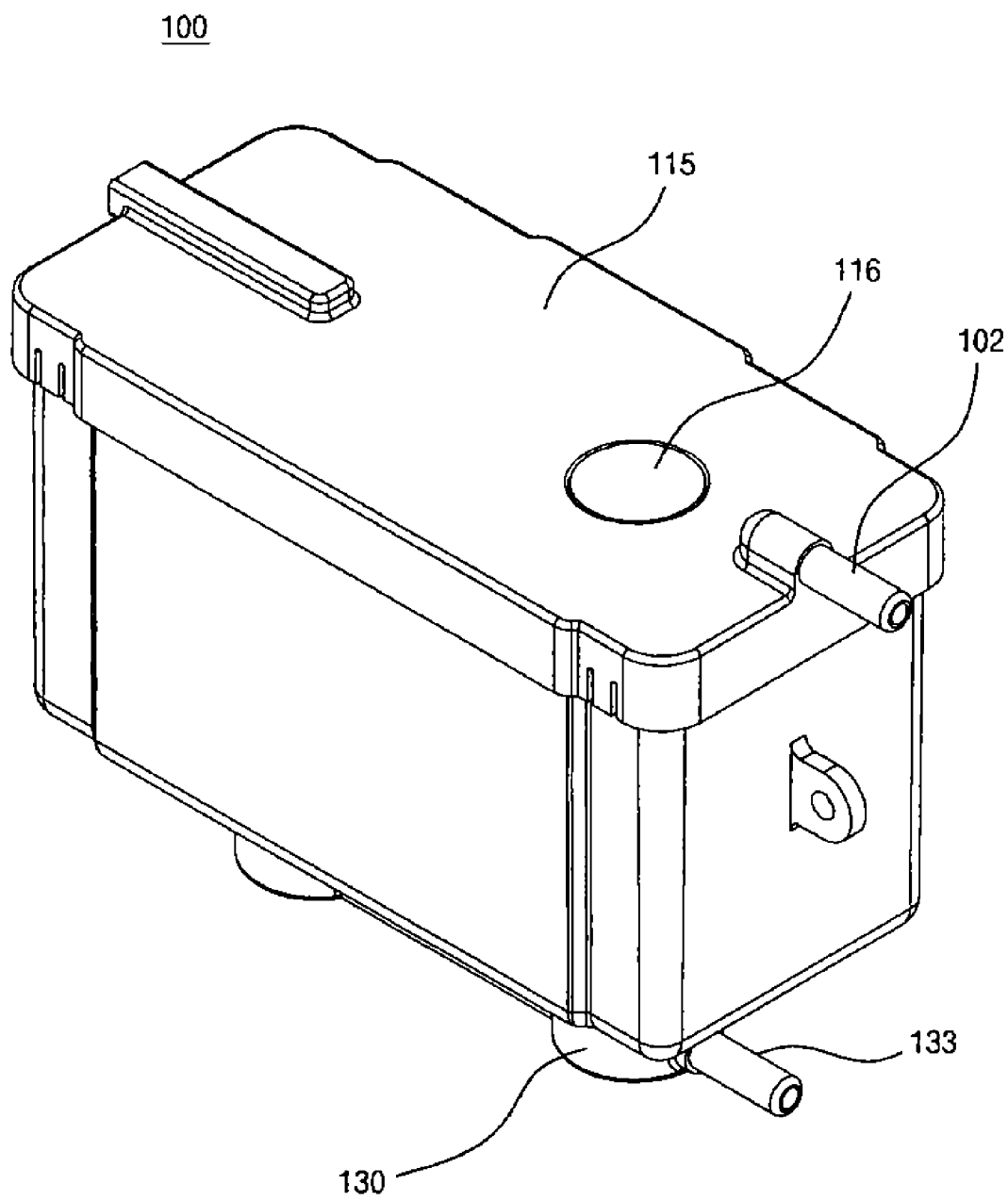
FIG. 1 is a perspective view illustrating a water level controlling device according to one embodiment of the present invention.
Figure 2:
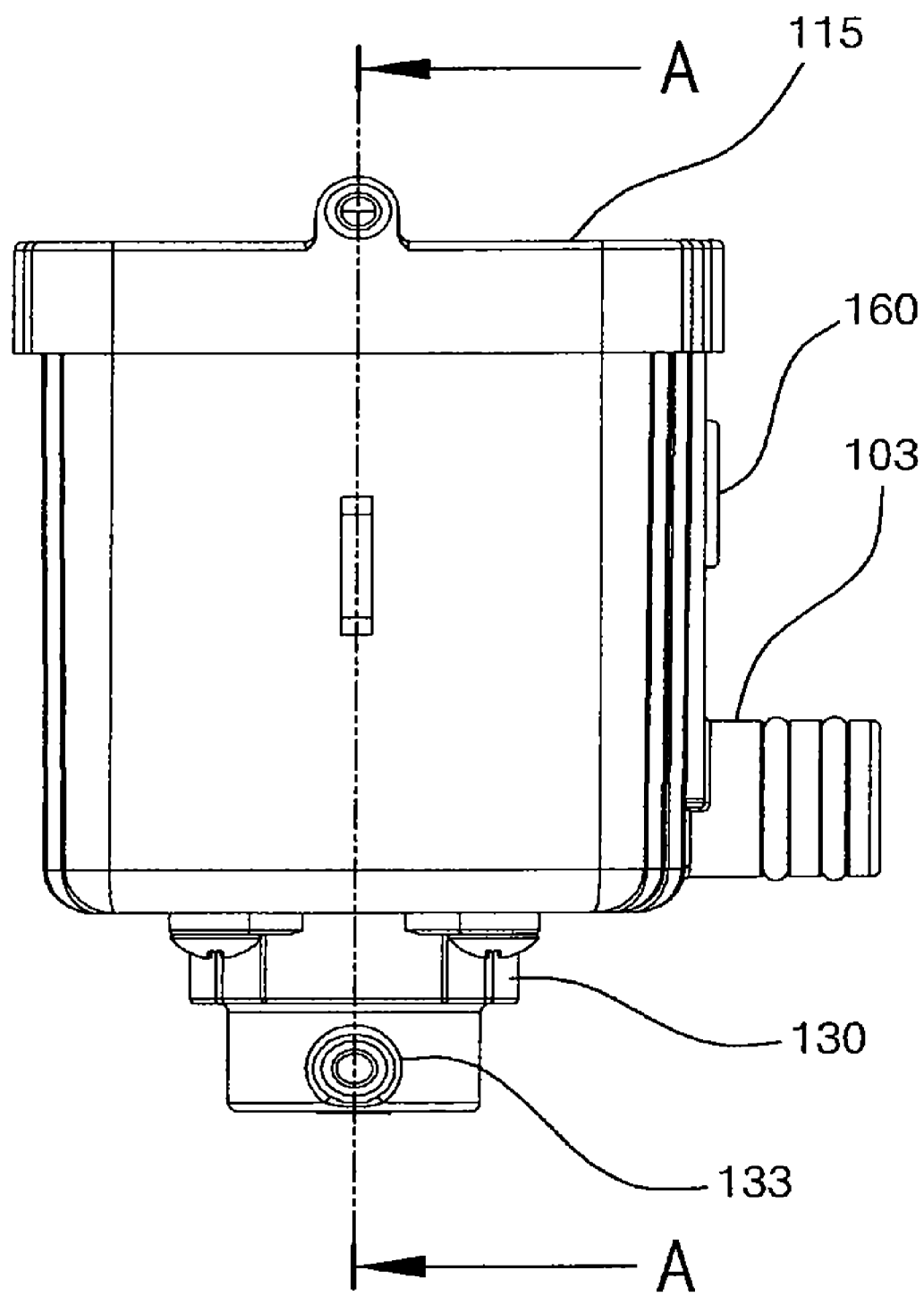
FIG. 2 is a right side view of FIG. 1.
Figure 3:
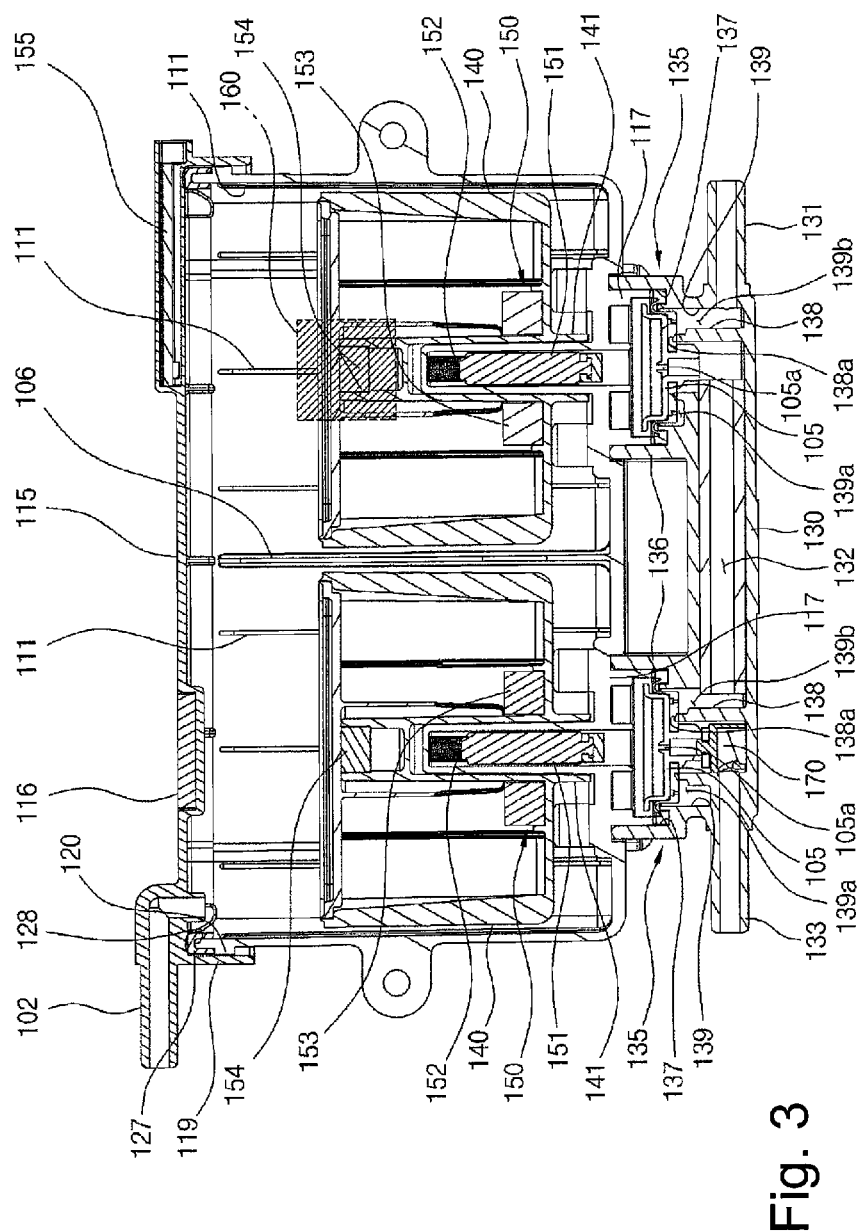
FIG. 3 is a sectional view taken along line A-A of FIG. 2.
Figure 4:
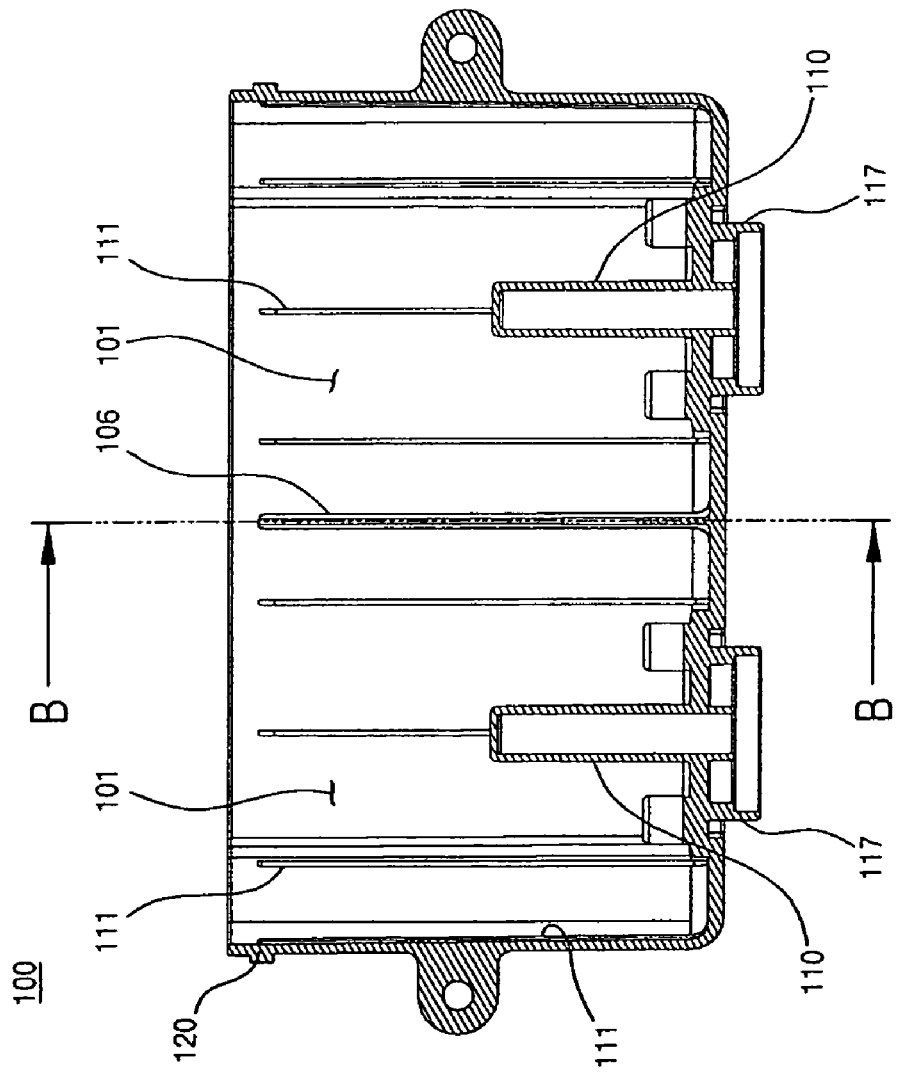
FIG. 4 is a view illustrating a water reservoir of FIG. 3.
Figure 5:
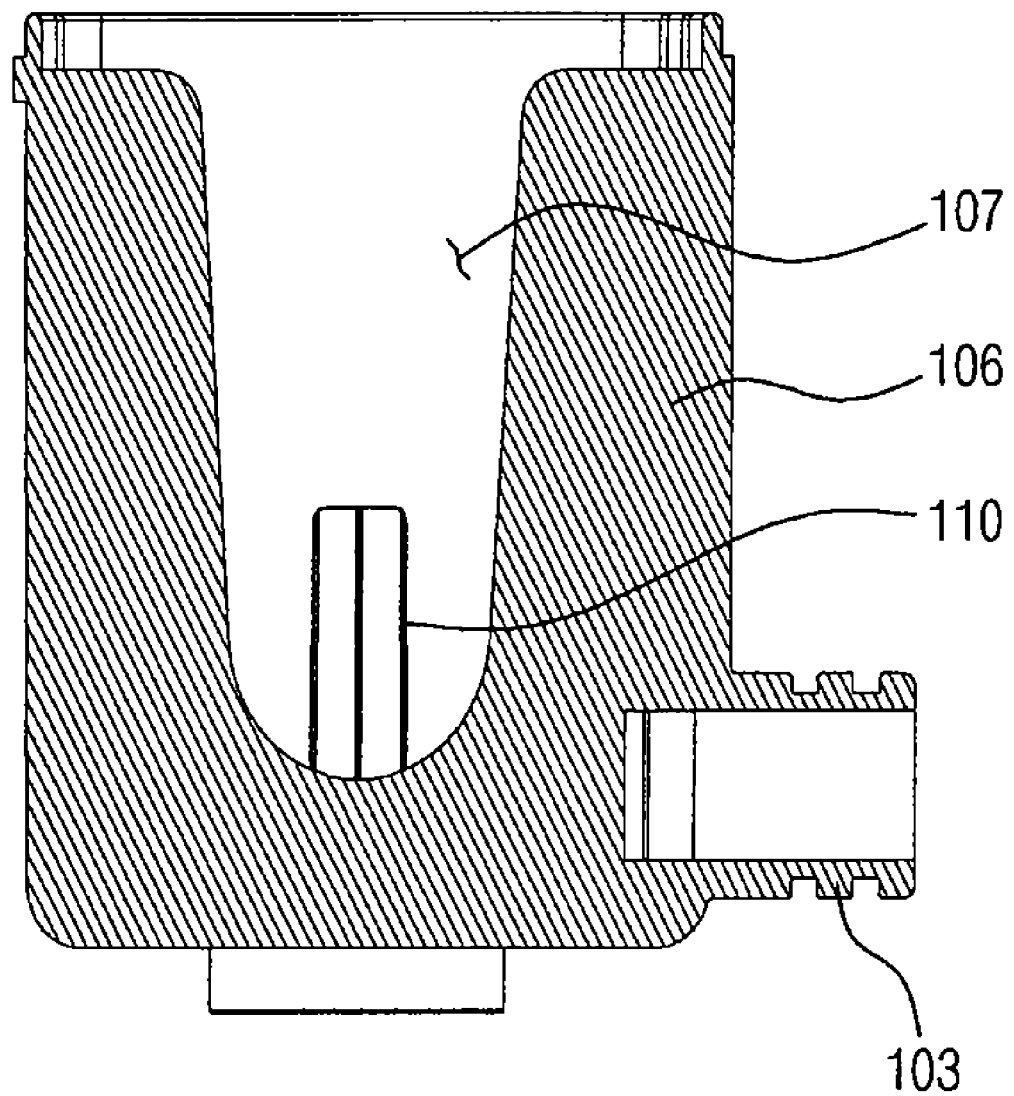
FIG. 5 is a sectional view taken along line B-B of FIG. 4 and illustrating the water reservoir.
Figure 6:
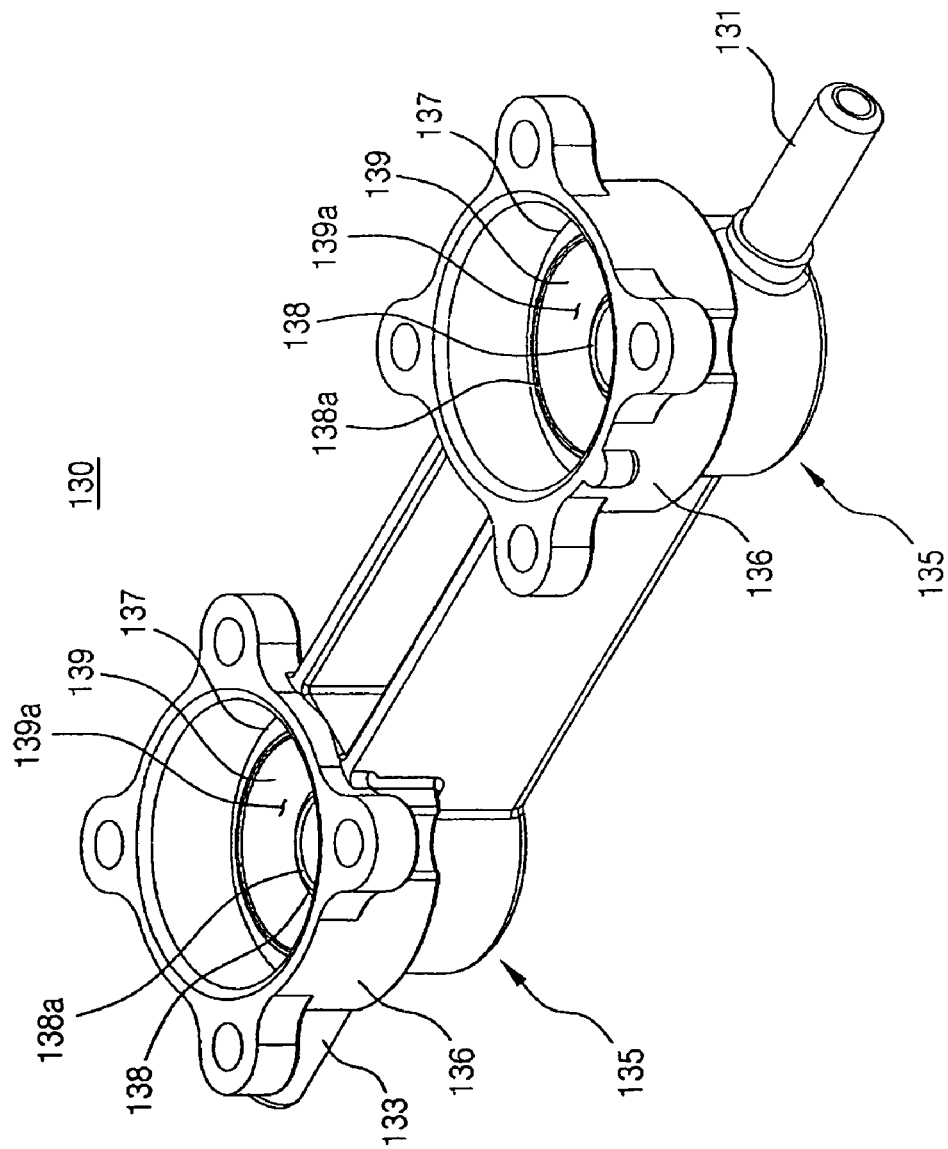
FIG. 6 is a perspective view illustrating a flow body.
Figure 7:
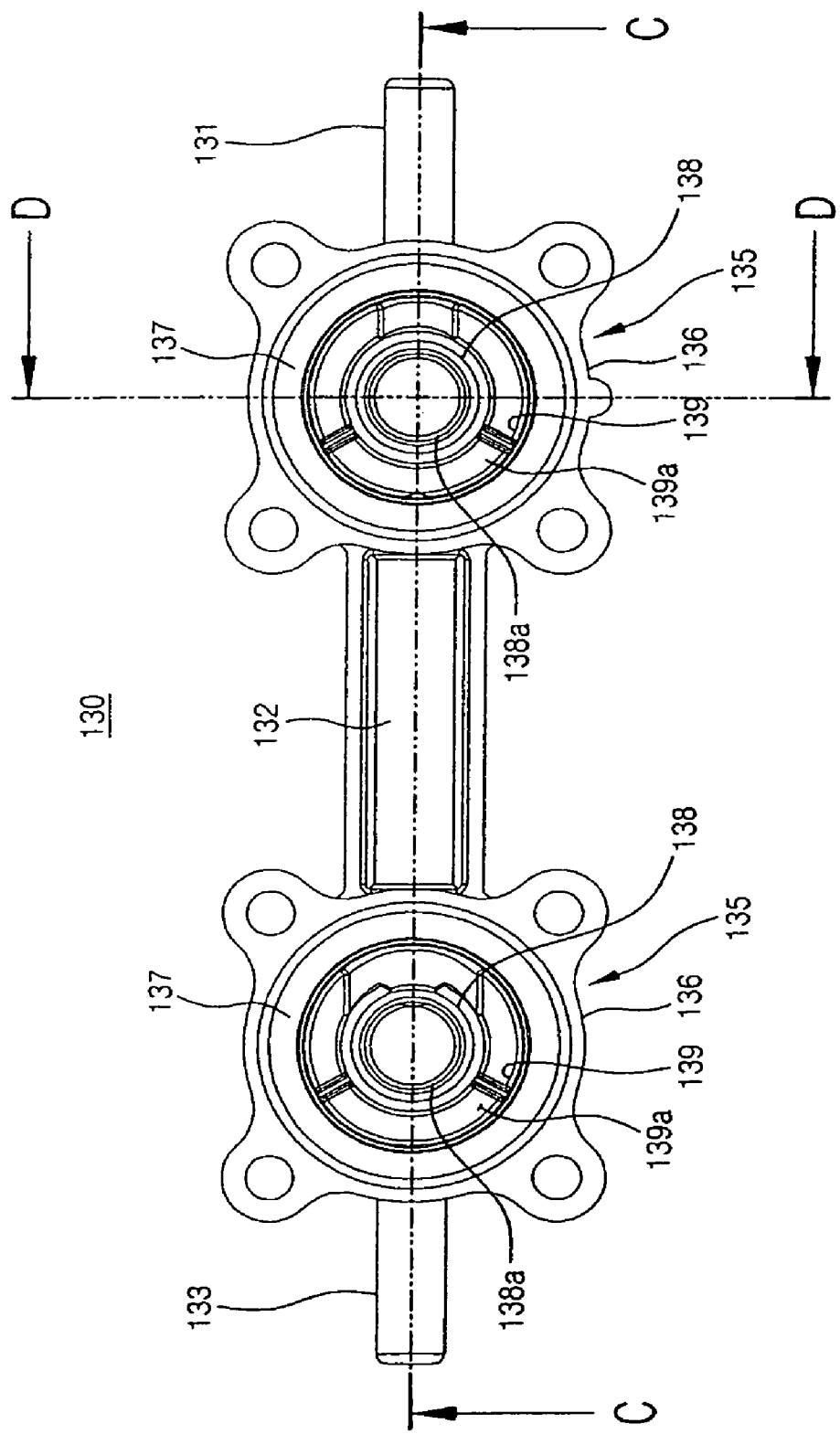
FIG. 7 is a plan view of FIG. 6.
Figure 8:
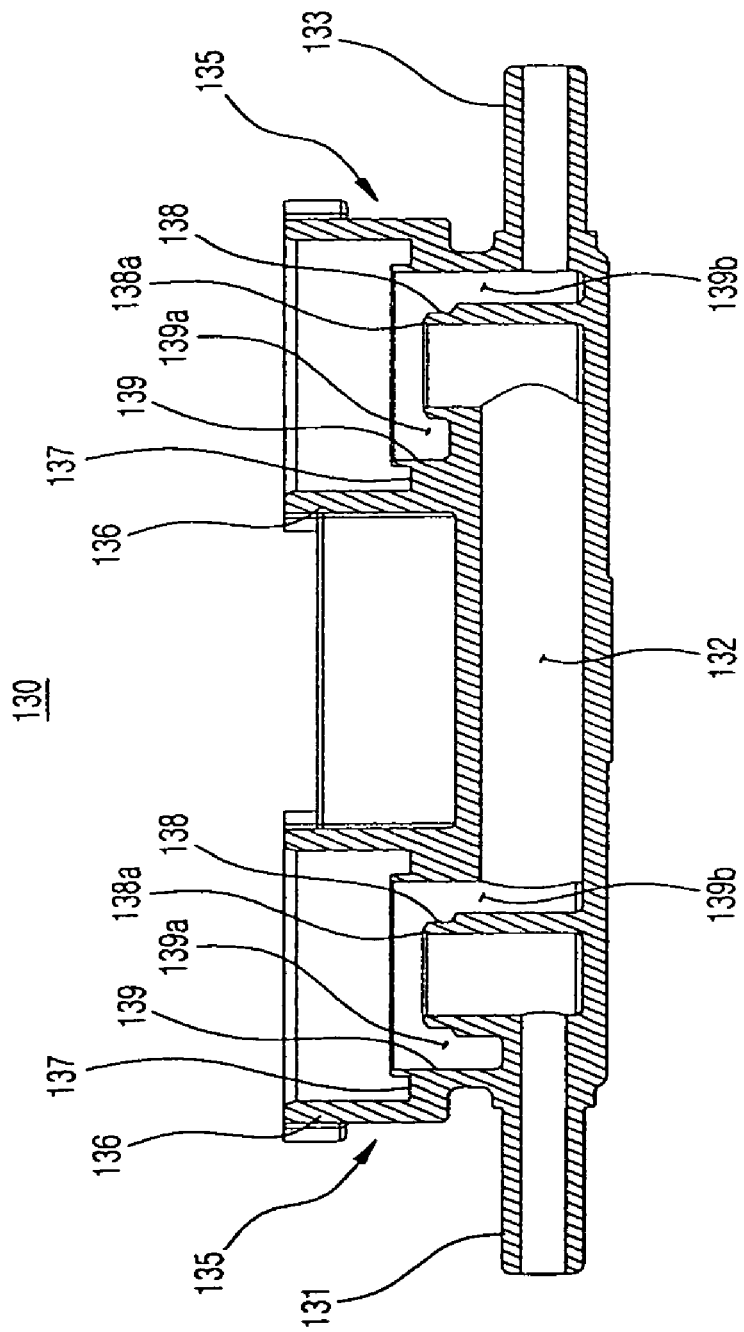
FIG. 8 is a sectional view taken along line C-C of FIG. 7.
Figure 9:
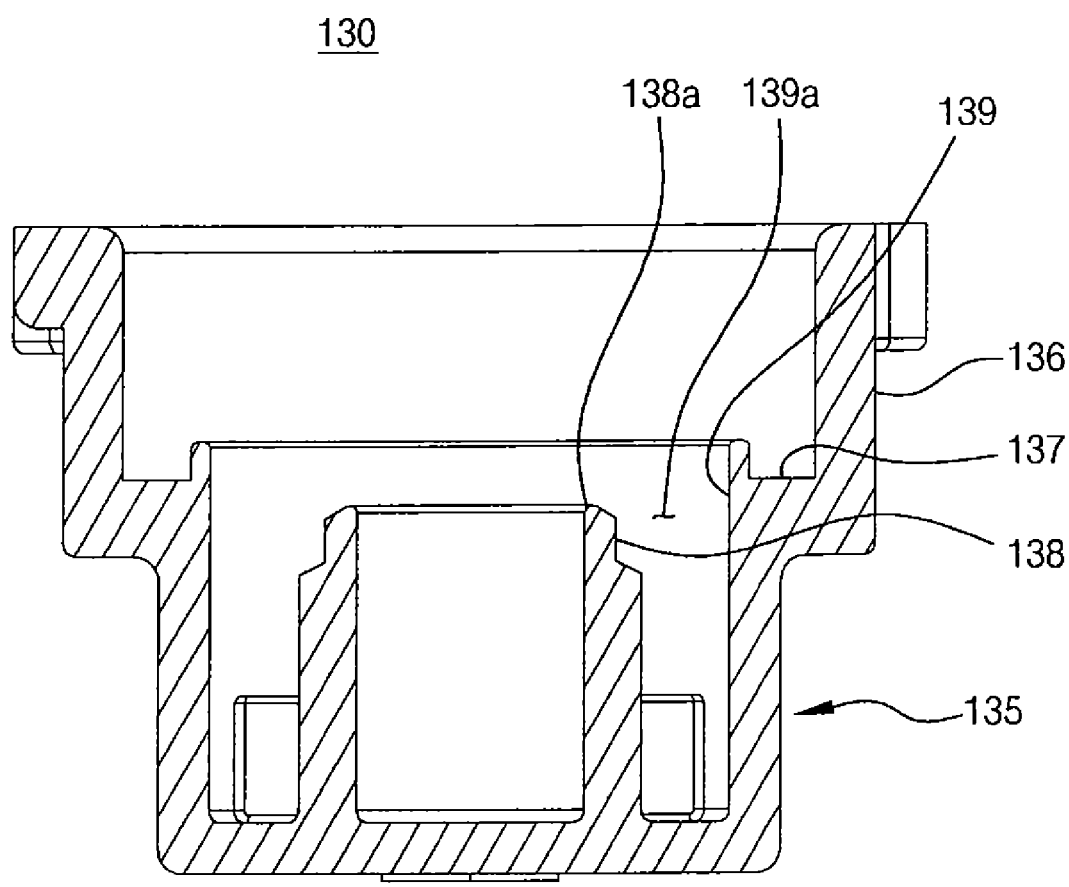
FIG. 9 is a sectional view taken along line D-D of FIG. 7.
Figure 10:
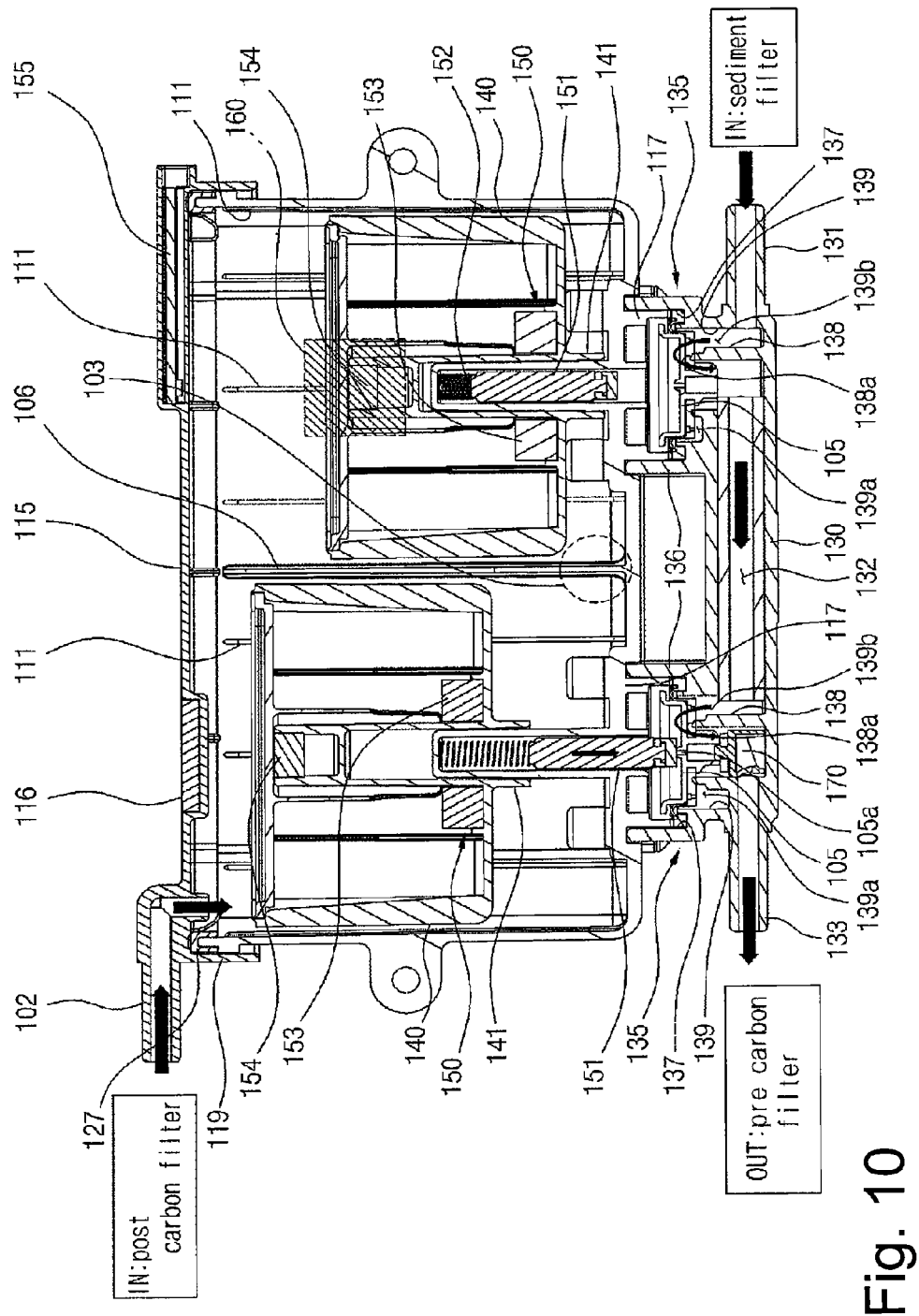
FIG. 10 is a view illustrating the operation of FIG. 3.

FIG. 1 is a perspective view illustrating a water level controlling device according to one embodiment of the present invention, FIG. 2 is a right side view of FIG. 1, FIG. 3 is a sectional view taken along line A-A of FIG. 2, FIG. 4 is a view illustrating a water reservoir of FIG. 3, FIG. 5 is a sectional view taken along line B-B of FIG. 4 and illustrating the water reservoir, FIG. 6 is a perspective view illustrating a flow body, FIG. 7 is a plan view of FIG. 6, FIG. 8 is a sectional view taken along line C-C of FIG. 7, FIG. 9 is a sectional view taken along line D-D of FIG. 7, and FIG. 10 is a view illustrating the operation of FIG. 3.

As shown in FIGS. 1 to 3, the water level controlling device according to the embodiment of the present invention includes a water reservoir 100, a flow body 130, floaters 140, and actuating means 150. The water reservoir stores purified water therein. The flow body is mounted to the lower portion of the water reservoir 100 and provides a circulation path 132 along which raw water circulates from a sediment filter of a filter unit to a pre carbon filter thereof. The floaters 140 provided on both sides of the inner space 101 of the water reservoir 100 are movable up and down according to the water level. Each actuating means 150 is operated by the vertical movement of the corresponding floater 140.

The water reservoir 100 has on both sides thereof the inner space 101 into which water is fed and stored, and the floaters 140 are movable up and down in the inner space. A plurality of diaphragms 105 is provided on the lower surface of the water reservoir 100, and is moved up and down by the actuating means 150 in a direction opposite the moving direction of the corresponding floaters 140, thus opening or closing the circulation path 132 of the flow body 130.

The flow body 130 is mounted to the lower surface of the water reservoir 100. An inlet 131 is provided on one end of the flow body 130 in such a way as to be connected to the sediment filter of the filter unit of the water purification system, while an outlet 133 is provided on the other end of the flow body 130. The circulation path 132 is defined in the flow body 130 to cause the inlet 131 and the outlet 133 to communicate with each other. A plurality of control parts 135 is provided in the circulation path 132 and functions to intercept the flow of water using the diaphragms 105.

Here, each floater 140 moves up and down according to the water level in the inner space 101 of the water reservoir 100. As the floater 140 rises, each diaphragm 105 is moved to the corresponding control part 135 by the actuating means 150, thus cutting off the flow of water which passes through the control part 135.

While raw water which is fed from the sediment filter to the inlet 131 of the flow body 130 passes through each control part 135 of the flow body 130, the corresponding diaphragm 105 is moved up, and thereafter the water passes through the circulation path 132. Subsequently, the water passes through another control part 135, the pre carbon filter of the filter unit, and a UF membrane filter or a reverse osmosis membrane filter corresponding to a main filter. Thereafter, the water passes through a post carbon filter. Through such a process, the water is purified. The purified water is fed into the inner space 101 of the water reservoir 100.

Further, while the purified water fed into the water reservoir 100 is taking on the same water level as the main tank which is connected to the water reservoir 100, each floater 140 is moved up. The inner space 101 of the water reservoir 100 reaches a predetermined water level which can prevent the purified water from overflowing the water reservoir even when the associated floater 100 rises. The diaphragm 105 of each of the control parts 135 which are provided on both sides of the lower portion of the flow body 130 is connected to the corresponding floater 140. Thus, the diaphragm 105 is moved downwards by each actuating means 150 which is operated in conjunction with the upward movement of the corresponding floater 140, so that the flow of raw water passing through the control part 135 is intercepted, the supply of the raw water to the downstream side of the pre carbon filter of the filter unit is intercepted, and the water reservoir 100 and the main tank maintain a constant water level.

Further, when water is dispensed from the water reservoir 100 through a cock of the main tank which is connected to a discharge port 103 provided on the center of the lower portion of the water reservoir 100, so that the water level is reduced, each floater 140 moves downwards and the force pressing the corresponding diaphragm 105 downwards by the actuating means 150 is reduced. Thereby, the diaphragm 105 may be moved upwards by the pressure of the raw water fed through the inlet 131 of the flow body 130. The control parts 135 provided on both sides of the flow body 130 are opened, so that the water may flow to each filter which is provided downstream the pre carbon filter of the filter unit. After the water passes through the filter unit and goes through the purifying operation, the water flows into the water reservoir 100. At this time, each floater 140 rises according to the water level of the purified water fed into the water reservoir.

The floaters 140 are provided in both sides of the water reservoir 100 in such a way as to divide the inner space 101 of the water reservoir 100 into two sections. The diaphragms 105 are provided on the lower portions of the corresponding floaters 140. As each floater 140 moves up and down, the corresponding diaphragm 105 independently opens or closes each of the control parts 135 which are provided on both sides of the flow body 130. Thus, even when one floater 140 rises in the water reservoir 100 and thereafter stops moving downwards or malfunctions, so that the flow intercepting operation of the control part 135 using one diaphragm 105 stops, the flow of water through the flow body 130 to the pre carbon filter can be reliably blocked if the other floater 140 is normally operated.

Referring to FIGS. 4 and 5, a partition wall 106 is provided in the center of the water reservoir 100 to partition the inner space 101 into two sections and guide the sliding motion of one surface of each floater 140. A water flow path 107 is formed in the partition wall 106 in such a way that its width is gradually reduced along a curved line from an upper position to a lower position. The floaters 140 are provided on opposite sides of the partition wall 106.

Further, guide members 110 protrude from the bottom of the water reservoir 100 and are slidably inserted into the corresponding floaters 140 starting from the lower portions thereof, thus guiding the vertical movement of the floaters 140.

In order to correspond to the guide members 110, slide parts 141 are provided on the lower surfaces of the corresponding floaters 140 in such a way as to protrude into the inner space thereof. Each slide part 141 into which the corresponding guide member 110 is slidably inserted has a circular cross section.

Further, ribs 111 are vertically provided on the inner wall of the water reservoir 100 to support the vertical movement of the floaters 140, so that a contact area between the inner wall of the water reservoir 100 and each floater 140 is reduced and thereby frictional force is reduced during the vertical movement of the floater 140. Each floater 140 can be easily moved up and down in the water reservoir 100 according to the water level.

Further, a lid 115 is provided on the top of the water reservoir 100 to close the inner space 101, and includes an air vent filter 116 having an antibacterial function. The air vent filter 116 allows air to circulate from the inner space 101 of the water reservoir 100 to the outside and prevents impurities contained in the external air from entering the water reservoir 100. A water supply pipe 102 connected to the post carbon filter is provided at a predetermined position on the lid 115. Thereby, equilibrium is maintained between the internal pressure and external pressure of the water reservoir 100 by circulating the air through the air vent filter 116 according to the water level of the water reservoir 100.

A packing 127 is provided on the upper end of the water reservoir 100 to be in close contact with the lower surface of the lid 115, thus preventing impurities from entering the water reservoir 100. The packing 127 closes a gap between the lid 115 and the water reservoir 100 and prevents fine dust or worms from entering the water reservoir 100 through the gap between the lid 115 and the water reservoir 100, thus keeping the interior of the water reservoir 100 perfectly hygienic.

Moreover, a vertical plate 119 is provided on the circumference of the lower surface of the lid 115 to surround the outer surface of the packing 127. A protrusion 120 may be provided on the upper portion of the water reservoir 100 to support the inner surface of the vertical plate 119 and the lower surface of the packing 127.

Further, a fitting groove 128 is formed in the packing 127, so that the upper end of the water reservoir 100 is fitted into the fitting groove 128. Thereby, the packing 127 can be firmly secured to the water reservoir 100 in such a way that the packing 127 is not dislodged from the upper end of the water reservoir 100.

A plurality of circle parts 117 is provided on the lower surface of the water reservoir 100 in a row in such a way as to protrude downwards, with the diaphragms 105 installed in the circle parts 117. The circle parts 117 are fixedly inserted into the corresponding control parts 135 of the flow body 130. The flow body 130 can be easily secured to the lower surface of the water reservoir 100 by coupling the circle parts 117 to the control parts 135.

Further, each guide member 110 is provided on the upper surface of the corresponding circle part 117, and each actuating means 150 for controlling the operation of the corresponding diaphragm 105 is located in the corresponding guide member 110, so that the associated control part 135 of the flow body 130 controls the flow of the water by the operation of the actuating means 150 through the circle part 117. The water reservoir 100 and the flow body 130 are coupled to each other via the circle parts 117 having the actuating means 150 and the control parts 135, so that they may be assembled into a compact coupling structure.

In detail, referring to FIGS. 6 to 9, each control part 135 includes a support plate 136 which has a circular inner wall such that the corresponding circle part 117 is inserted into the support plate 136. An annular groove 137 is formed in the lower portion of the support plate 136 so that the lower end of the circle part 117 is inserted into the annular groove 137.

Further, the control part 135 includes a control pipe 138, an annular guide wall 139 and a coupling path 139b. The control pipe 138 defines a path for moving water downwards in a circulation path 132 and is opened or closed by the vertical movement of the corresponding diaphragm 105. The annular guide wall 139 surrounds the upper portion of the control pipe 138, and provides an annular path 139a for guiding the upward flow of water from the lower portion of the control pipe 138 to the upper portion of the control pipe 138. The coupling path 139b is provided on the lower portion of a side of the annular guide wall 139 and connected to the circulation path 132, thus permitting water to flow from the circulation path 132 to the annular path 139a and thereby allowing water to be introduced from the circulation path 132 into the control pipe 138.

A contact end 138a is provided on the upper end of each control pipe 138 and tapered, becoming gradually narrower, in a direction from the lower end of the contact end 138a to the upper end thereof so that the contact end 138a is in more close contact with the corresponding diaphragm 105. Thereby, the discharge of water upwards from the control pipe 138, which may occur, can be more reliably prevented by the diaphragm 105.

Further, each actuating means 150 is slidably coupled to the lower surface of the water reservoir 100 in such a way as to move up and down, and the vertical movement of the actuating means 150 may be supported by magnetic force. The actuating means 150 includes a plunger 151 which is connected at the lower end thereof to the diaphragm 105. A spring 152 is provided above the plunger 151 to compress the plunger 151, thus providing the pressurizing force necessary for closing the control part 135 to the diaphragm 105. A circular magnet 153 is provided on the upper portion of the plunger 151 to surround the plunger 151, and it is secured to the interior of the floater 140. While the plunger 151 is moving upwards, the circular magnet 153 applies magnetic force to the plunger 151 and stops the downward movement of the plunger 151 which is also being compressed by the spring 152.

Referring to FIG. 10, raw water is fed into the inlet 131 of the flow body 130, so that an associated diaphragm 105 is moved upwards by the water pressure, and the plunger 151 is supported by the magnetic force of the corresponding circular magnet 153, so that the corresponding control pipe 138 is kept open by the diaphragm 105. In this state, the operation of the control part 135 using the associated actuating means 150 is as follows.

When raw water is continuously fed into the flow body 130, so that the water level of the water reservoir 100 is increased and the associated floater 140 is moved upwards, the corresponding circular magnet 153 surrounding the slide part 141 is moved upwards from the bottom of the floater 140. AT this time, the magnetic force of the circular magnet 153 acting on the plunger 151 is reduced rapidly while the circular magnet 153 is removed from the upper portion of the plunger 151. The plunger 151 is moved downwards by the elastic force of the spring 152. As the plunger 151 moves downwards, a small hole 105a which is formed in the center of the diaphragm 105 provided above each control part 135 is closed, and a difference in pressure between the upper and lower portions of the diaphragm 105 occurs.

That is, the projected area of the lower portion of each diaphragm 105 is smaller than the projected area of the upper portion of the diaphragm 105 due to the water pressure, so that a difference in water pressure occurs due to a difference in sectional area. The diaphragm 105 is moved downwards, thus closing the control pipe 138 of the corresponding control part 135, and preventing the raw water from flowing from the control pipe 138 through the annular path 139a and the coupling path 139b to the pre carbon filter. Here, since the diaphragm 105 is known technology in the field of a pipe valve, the operation of the diaphragm will not be described in detail herein.

When the water level in the water reservoir is lowered, each floater 140 is moved downwards. When the floater 140 reaches the lower surface of the water reservoir, the magnetic force of the circular magnet 153 provided in the floater 140 affects the corresponding plunger 151. When the floater 140 is moved completely downwards, the magnetic force which is applied by the circular magnet 153 in the floater 140 becomes larger than the force resulting from the weight of the plunger 151 and the rigidity of the spring 152 and force pushing the plunger 151 by water pressure, so that the plunger 151 is moved upwards, and the circular magnet 153 is located at the central portion of the plunger 151.

At this time, the plunger 151 is moved upwards by the magnetic force of the circular magnet 153. The pressure acting on the upper portion of the diaphragm 105 is reduced, so that balance of force between the upper and lower portions of the diaphragm 105 is lost. By the pressure of water flowing into the inlet 131, the diaphragm 105 is moved upwards again, and the control pipe 138 is opened, so that the raw water is supplied to the pre carbon filter.

Here, if the springs 152 provided above respective control parts 135 to bias the corresponding plungers 151 have different elastic moduli, the opening or closing operation of the control pipes 138 may be performed in predetermined order by the corresponding diaphragms 105.

That is, in the case of the plunger 151 biased by the spring 152 having a higher elastic modulus, the elastic force of the spring 152 for overcoming the magnetic force of the circular magnet 153 acts first. Thus, in comparison with the plunger 151 biased by the spring 152 having a lower elastic modulus, the diaphragm 105 which is provided around the plunger 151 biased by the spring 152 having the high elastic modulus is moved downwards first. The diaphragm 105 which is provided on a side having a higher elastic modulus is always operated to close the control pipe 138 of the corresponding control part 135. When the diaphragm 105 provided on the side having the higher elastic modulus is not operated, the plunger 151 biased by the spring 152 having a lower elastic modulus moves the corresponding diaphragm 105 downwards, thus closing the control part 135.

Meanwhile, an ND magnet 154 serving as a magnetic body is provided on the upper portion of each floater 140. A magnetic sensor 155 is provided on the upper portion of the water reservoir 100. As each floater 140 rises, variation in magnetic force occurs due to the access to the ND magnet 154, so that the magnetic sensor 155 detects the full water level of the water reservoir 100. In this case, any one of a reed switch, a MR sensor and a hall sensor may be used as the magnetic sensor 155.

Further, a water level sensor 160 may be provided at a predetermined position of the water reservoir 100 to detect the full water level in the water reservoir 100. The water level sensor 160 prevents the defective detection of a full water level due to the malfunction of each floater 140. Of course, in order to measure the full water level in the water reservoir 100, both or either of the magnetic sensor 155 and the water level sensor 160 may be applied.

Here, a constant flow regulating valve 170 may be further provided in the circulation path 132 of the flow body 130 to control the flow rate of raw water. Particularly, the constant flow regulating valve 170 may be provided in the associated control part 135 under the diaphragm 105 so as to regulate the water level of the water reservoir 100. The constant flow regulating valve 170 according to the present invention controls the flow rate such that it is 1 L/min or less, thus preventing the deterioration of a water purifying function due to a high flow rate. Further, the flow rate can be controlled as desired by manipulating the constant flow regulating valve 170, controlling velocity of flow.

As described above, the present invention provides a water level controlling device, which provides a mechanical valve for controlling a water level by performing a dual intercepting operation using a plurality of floaters which are independently operated, so that when the supply of water to a water reservoir by the primary floater is defective, the supply of water to the water reservoir can be reliably intercepted by the secondary floater, thus controlling the water level by the reliable blocking of water to the water reservoir, and preventing the interior of a water purification system from being contaminated by a lid having an air vent filter, and efficiently utilizing the inner space of the water reservoir by arranging the floaters on both sides, and reducing noise of the water purification system.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A device for controlling a water level, comprising:
a water reservoir having inner space such that water is introduced and stored therein, with a plurality of diaphragms provided on a lower surface of the water reservoir in such a way as to move up and down;

a flow body mounted to the lower surface of the water reservoir, and defining a circulation path such that water is fed into a first end of the flow body and is discharged to a second end of the flow body, with a plurality of control parts provided in the circulation path to block a flow of water by the corresponding diaphragms;

a plurality of floaters moving up and down in the inner space of the water reservoir according to a water level; and actuating means for moving each of the diaphragms to the corresponding control part as each of the floaters rises, thus intercepting the flow of water passing through the control part.

2. The device as set forth in claim 1, wherein a partition wall is provided in a center of the water reservoir to part the inner space, and a flow path is formed in the partition wall, and the floaters are provided on opposite sides of the partition wall.

3. The device as set forth in claim 1, wherein a guide member protrudes from a bottom of the water reservoir and is slidably coupled to each of the floaters to guide vertical movement of the floater.

4. The device as set forth in claim 3, wherein a slide part is provided on a lower surface of each of the floaters in such a way as to protrude into an inner space of the floater, so that the guide member is slidably inserted into the slide part.

5. The device as set forth in claim 1, wherein a rib is vertically provided on an inner wall of the water reservoir to support the vertical movement of each of the floaters.

6. The device as set forth in claim 1, wherein a lid is provided on top of the water reservoir to close the inner space thereof, and includes an air vent filter which allows air to circulate from the inner space of the water reservoir to an outside and prevents impurities contained in external air from entering the water reservoir.

7. The device as set forth in claim 6, wherein the air vent filter includes an antibacterial function.

8. The device as set forth in claim 6, wherein a packing is provided on an upper end of the water reservoir and is in close contact with a lower surface of the lid, thus preventing impurities from entering the water reservoir.

9. The device as set forth in claim 8, wherein a vertical plate is provided on a circumference of the lower surface of the lid to surround an outer surface of the packing, and a protrusion is provided at a predetermined position on an upper portion of the water reservoir to support an inner surface of the vertical plate and a lower surface of the packing.

10. The device as set forth in claim 8, wherein a fitting groove is formed in the packing so that the upper end of the water reservoir is fitted into the fitting groove.

11. The device as set forth in claim 1, wherein a plurality of circle parts is provided on the lower surface of the water reservoir in a row in such a way as to protrude downwards, with the corresponding diaphragms provided in the circle parts, and the plurality of circle parts is inserted into the corresponding control parts of the flow body.

12. The device as set forth in claim 1, wherein each of the control parts comprises a support plate having a circular inner wall so that the corresponding circle part is inserted into and secured to the support plate, and an annular groove is provided in a lower portion of the support plate so that a lower end of the corresponding circle part is inserted into the annular groove.

13. The device as set forth in claim 1, wherein each of the control parts comprises:
   a control pipe for defining therein a path along which water flows downwards, the control pipe being opened or closed by vertical movement of the corresponding diaphragm;
   an annular guide wall surrounding an upper portion of the control pipe, and guiding the flow of water in a direction from a lower portion of the control pipe to the upper portion thereof; and
   a coupling path provided on a lower portion of a side of the annular guide wall and connected to the circulation path, thus permitting water to flow through an annular path to the control pipe.

14. The device as set forth in claim 13, wherein a contact end is provided on an upper end of the control pipe and becomes gradually sharper in a direction from a lower position to an upper position to be in close contact with the corresponding diaphragm.

15. The device as set forth in claim 1, wherein the actuating means comprises:
   a plunger slidably coupled to the lower surface of the water reservoir in such a way as to move up and down, and secured to a predetermined position by magnetic force, a lower end of the plunger being detachably attached to the corresponding diaphragm;
   a spring provided above the plunger and compressing the plunger to provide pressurizing force for closing each of the control parts to the corresponding diaphragm; and
   a circular magnet provided on an upper portion of the plunger to surround the plunger, and secured to an interior of the corresponding floater, the circular magnet applying magnetic force to the plunger when the plunger is moved upwards, thus stopping downward movement of the plunger which is biased by the spring.

16. The device as set forth in claim 15, wherein each of the control parts has the spring of a different elastic modulus, thus specifying an order for closing the control parts.

17. The device as set forth in claim 1, wherein a magnetic body is provided on an upper portion of each of the floaters, and a magnetic sensor is provided on the upper portion of the water reservoir and changes magnetic force when each of the floaters moves upwards and the magnetic body approaches the magnetic sensor, thus detecting a full water level of the water reservoir.

18. The device as set forth in claim 17, wherein the magnetic sensor is selected from a group consisting of a reed switch, a MR sensor, and a hall sensor.

19. The device as set forth in claim 1, further comprising:
   a water level sensor provided at a predetermined position of the water reservoir to detect the full water level of the water reservoir.

20. The device as set forth in claim 1, further comprising:
   a constant flow regulating valve provided in the circulation path to regulate a flow rate of introduced water.

21. The device as set forth in claim 20, wherein the constant flow regulating valve is provided in the control part under an associated diaphragm.

22. The device as set forth in claim 20, wherein the constant flow regulating valve controls the flow rate such that it is 1 L/min or less.

* * * * *